Dec. 15, 1925. 1,566,179
C. G. WILMARTH
ANT TRAP
Filed July 23, 1925
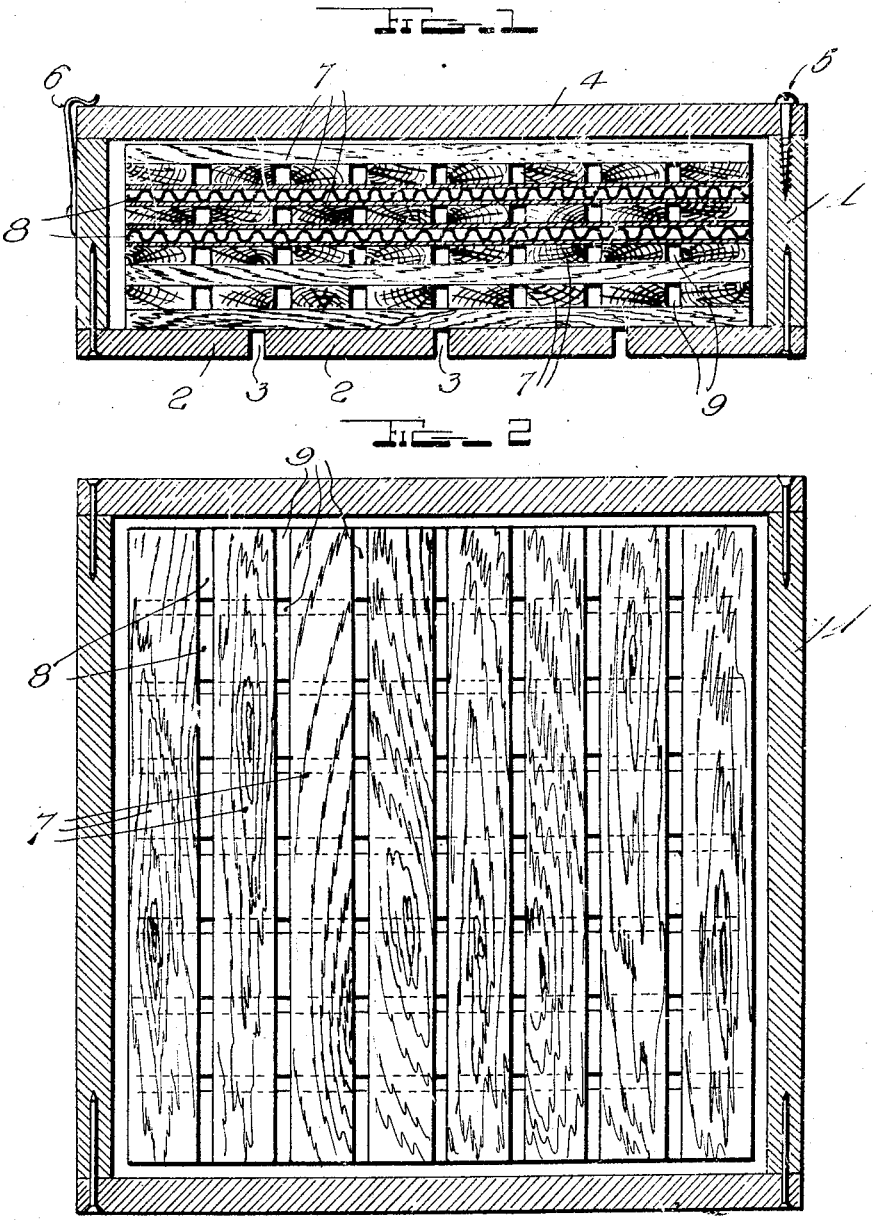
Inventor
Charles G. Wilmarth,
Witness
By
Attorneys Patented Dec. 15, 1925.

1,566,179

UNITED STATES PATENT OFFICE.

CHARLES G. WILMARTH, OF SALINA, KANSAS.

ANT TRAP.

Application filed July 23, 1925. Serial No. 45,670.

*To all whom it may concern:*

Be it known that I, CHARLES G. WIL-MARTH, a citizen of the United States, residing at Salina, in the county of Saline and State of Kansas, have invented certain new and useful Improvements in Ant Traps; and I do declare the following to be a full, clear, and exact description of the invention, such as will enable others skilled in the art to which it appertains to make and use the same.

The invention relates to improvements in traps for luring and trapping ants, the primary object being to provide an exceptionally simple and inexpensive device of this character, yet one which will be efficient to a high degree, because of permitting the ants to practice their consumption of wood materials, such as strips of oak, or strips of board formed of wood fiber.

With the foregoing in view the invention resides in the novel subject matter hereinafter described and claimed, the description being supplemented by the accompanying drawing.

Figure 1 is a vertical sectional view of a trap constructed in accordance with my invention.

Figure 2 is a horizontal sectional view.

In carrying out my invention I make use of a shallow wooden box 1 having its bottom formed of slats 2 which are spaced apart to provide slots 3 through which the ants may enter the box. A cover 4 of any desired waterproof material is provided for the box 1, said cover being pivoted as at 5 and held normally in place by any suitable means such as a spring clip 6. When this clamping means is released, the cover may readily be swung aside to permit discharge of the contents of the box.

Within the box 1 and substantially filling the same, I provide a honey comb of crossed strips which are disposed in layers, the strips of any layer all running in one direction, being spaced apart, and being at right angles to the strips of the next adjacent layer. These strips may be formed of wood or of any material constructed of wood fiber. The strips indicated at 7 in the drawing may be considered as strips of oak, while those disclosed at 8 are formed of corrugated cardboard, commonly known as straw board. The spaces 9 between the strips, permit free passage of the ants to all points of the honey comb core of the box and as this core is formed from a material or materials upon which the ants will feed, the trap will in a short time be filled with the insects, whereupon its contents may be dumped into a receptacle containing coal oil or the like or may be burnt. Then, when a new core is inserted and cover closed, the trap is in readiness for further use.

In setting the trap in cold weather, it should be placed in a comparatively warm basement room on a thin layer of earth, and in some suitable manner, the space around the trap should be darkened. During warm weather, the traps may be buried about one and one half inches under the surface of the ground and if examined the next day following a good shower of rain, will be found to contain multitudes of the termites. Any desired number of the traps may of course be used at one time, but they are preferably employed in lots of a dozen or more, when set outside of buildings, while I prefer to use them in clusters ranging from four to six in number, when set in basements or in other portions of buildings. The traps form temporary abodes or dens for the harbor of the insects where they will not only congregate in great numbers but may also practice their consumption of wood materials. The improved traps are thus exceptionally efficient, regardless of the fact that they are of extremely simple and inexpensive construction.

Excellent results have been obtained from the general construction shown and it is therefore preferably followed. However, within the scope of the invention as claimed, numerous minor changes may be made. As for size, that is left to the discretion of the manufacturer or user but I have found that a box about six inches square with an inside depth of one inch or slightly more, is best suited.

I claim:

An ant trap comprising a box having a removable top and a slatted bottom, the slats of said bottom being spaced apart to provide entrance slots, a honey comb core substantially filling the entire interior of the box, said core being formed of woody material, said core being readily removable by inverting the box and being adapted to be used for one catch and then discarded.

In testimony whereof I have hereunto affixed my signature.

CHARLES G. WILMARTH.